United States Patent [19]
Meinholdt

[11] 3,941,021
[45] Mar. 2, 1976

[54] SHEARING APPARATUS
[76] Inventor: John W. Meinholdt, 1900 N. Central, Topeka, Kans. 66608
[22] Filed: Jan. 17, 1975
[21] Appl. No.: 541,859

[52] U.S. Cl. ....................... 83/604; 83/633; 83/644; 83/646
[51] Int. Cl.² .......................................... B26D 5/18
[58] Field of Search ............ 83/601, 604, 644, 646, 83/633

[56] References Cited
UNITED STATES PATENTS

| | | | |
|---|---|---|---|
| 3,195,387 | 7/1965 | Telfer | 83/604 |
| 3,866,522 | 2/1975 | Oswalt | 83/606 X |

*Primary Examiner*—Donald R. Schran
*Attorney, Agent, or Firm*—Fishburn, Gold & Litman

[57] ABSTRACT

A shearing apparatus for cutting metal, sheets, plates, and the like includes a frame having a bed plate extending between opposite ends of the frame and an elongated shearing member having one end pivotally connected to the frame adjacent one end of the frame and the other end of the shearing member is movable between guide members extending upwardly from the bed plate and adjacent the other end of the frame in response to operation of an extensible member having one end thereof pivotally mounted on the one end of the shearing member and the other end thereof pivotally connected to a first pivot point of a crank arm which has a second pivot point having the other end of the shearing member pivotally connected thereto and a third pivot point having one end of a connecting link pivotally connected to the third pivot point and the connecting link has the other end thereof pivotally connected to the other end of the frame and adjacent the guide members.

6 Claims, 4 Drawing Figures

SHEARING APPARATUS

The present invention relates to improvements in metal working apparatus and more particularly to such metal working apparatus having an improved linkage for moving a metal cutting or forming member.

The principal objects of the present invention are: to provide a metal working apparatus having a novel linkage effecting an increased shearing force at the movable end of a shearing member; to provide such an apparatus having a shear blade swinging on an axis adjacent one end and a power means and crank arm operatively connected adjacent the other end with a shifting crank arm connected to a base to operate the shear blade; to provide such a shearing apparatus wherein the linkage includes a crank arm with a fulcrum thereof pivotally connected to a swingable link member; to provide such a shearing apparatus wherein the power means and linkage includes an extensible member having end portions pivotally connected to a frame and a crank arm respectively, the crank arm being pivotally connected to an end of the shearing member and pivotally connected to one end of a connecting link having the other end pivotally connected to the other end of a supporting frame; to provide such a shearing apparatus wherein the linkage for movement of the shearing member has a changing moment and is operative to increase shearing force during shearing movement of the blade; and to provide such a shearing apparatus wherein the linkage is operative to provide a smooth, positive, and shock free operation and which is durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the shearing apparatus.

Figure 1:
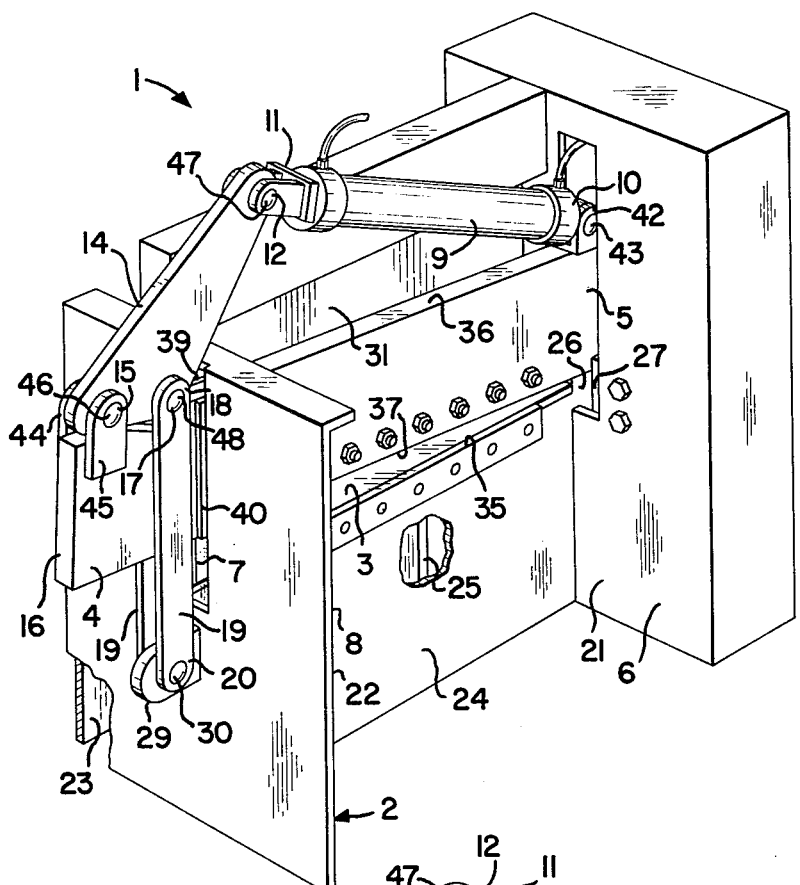
FIG. 1 is a perspective view of a metal working apparatus embodying features of the present invention.
Figure 2:
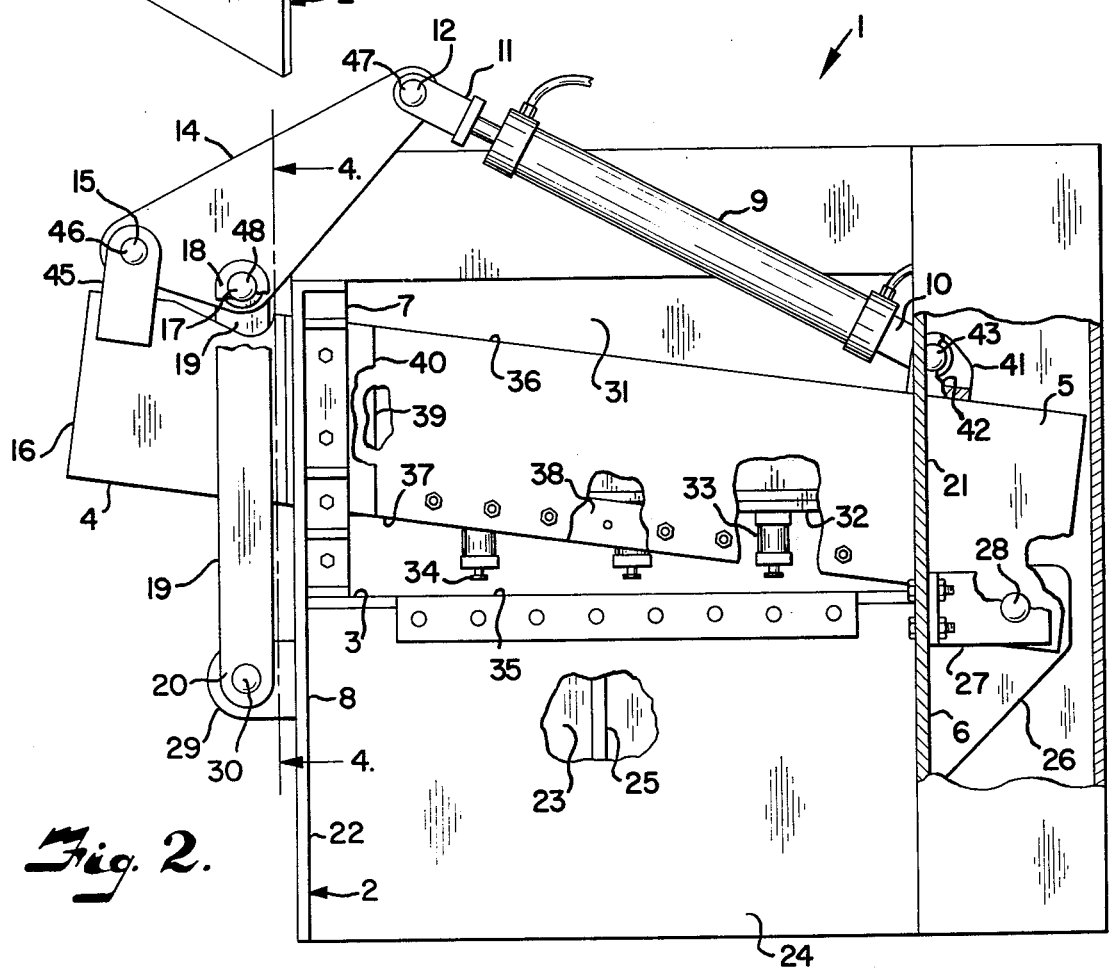
FIG. 2 is a rear elevational view of the metal working apparatus with portions broken away to show a linkage for moving a metal engaging member.
Figure 3:
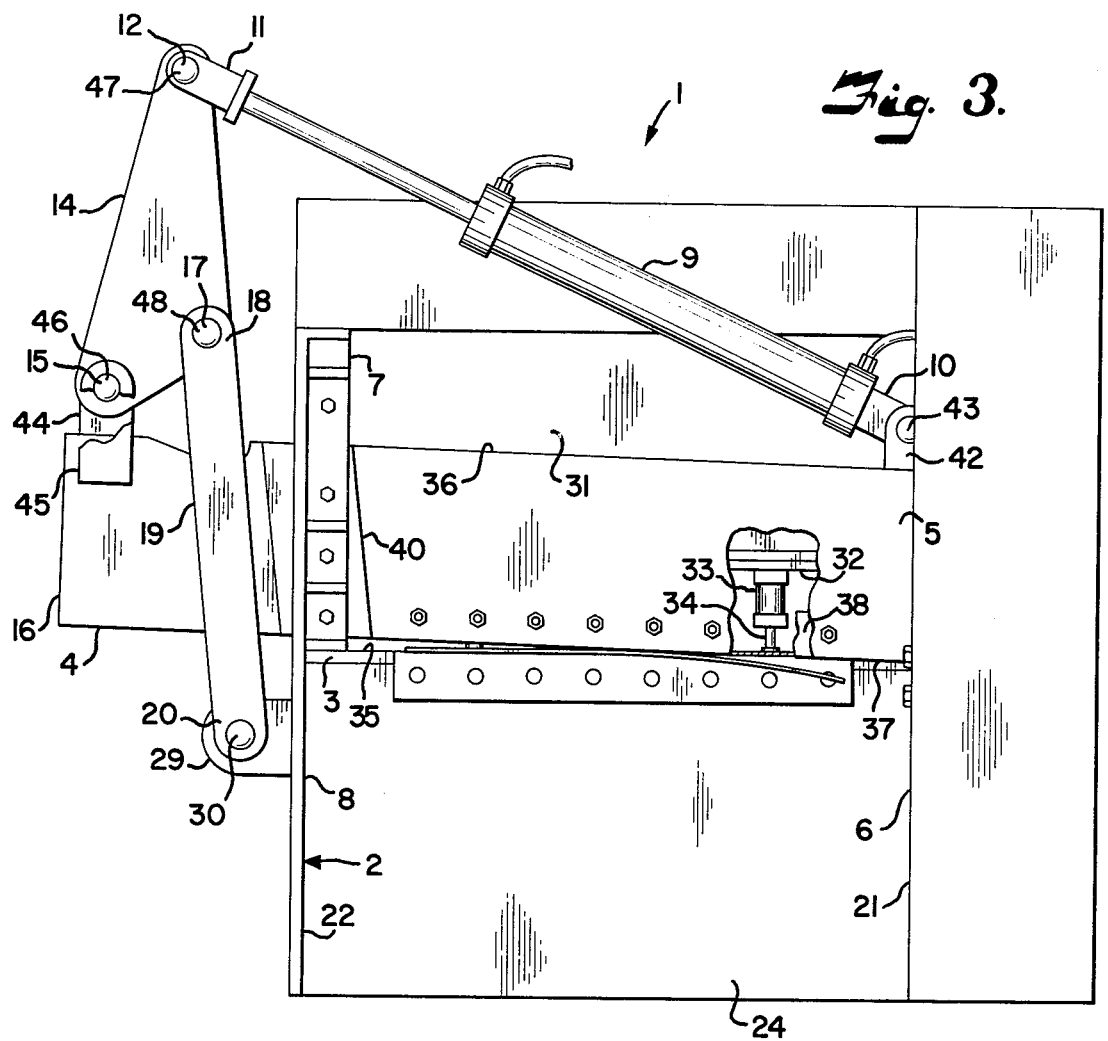
FIG. 3 is a rear elevational view showing the metal engaging member in a metal engaging position.
Figure 4:
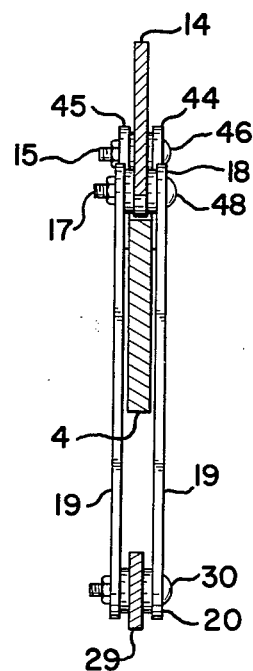
FIG. 4 is a fragmentary transverse sectional view taken on line 4—4, FIG. 2 and particularly showing the linkage for moving the metal engaging member.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a metal working apparatus for working metal sheets, plates and the like. The metal working apparatus includes a frame 2 with a bed plate and shear edge cooperating with a swingable shear blade that has a pivot or bearing mounting adjacent one end and carried by the frame so swinging of the blade will cut material between said blade and shear edge. The shear blade is operated by a power member and crank arm mounted relative to the frame or shear blade to apply shearing force to the blade on downward swinging movement thereof. The crank arm has a pivotal connection to the shear blade adjacent the end remote from the pivot mounting thereof on the frame. The connection of the arm with the shear blade is spaced from a crank arm fulcrum that is shiftably carried by the frame to accommodate the arc of movement of the connection between the arm and the shear blade. The power means is connected to the arm in spaced relation to the fulcrum to provide a relatively long lever action and increased force to the shear blade.

In the form illustrated, the apparatus includes a frame 2 having a bed plate 3 extending between opposite ends of the frame 2 and an elongated metal engaging or shearing member 4 having one end 5 thereof pivotally connected to the frame 2 adjacent one end 6 thereof and the other end of the shearing or metal engaging member 4 is movable between guide members 7 extending upwardly from the bed plate 3 adjacent the other end 8 of the frame 2 in response to operation of a power means shown as an extensible member 9. The member 9 has one end 10 thereof pivotally mounted on the one end 5 of the member 4 and the other end 11 pivotally connected to a first pivot point 12 of a crank arm 14 which has a second pivot point 15 having the other end 16 of the shearing member 4 pivotally connected thereto and a third pivot point 17 having one end 18 of a connecting link 19 pivotally connected thereto and the connecting link 19 has the other end 20 thereof pivotally connected to the other end 8 of the frame 2 adjacent the guide members 7.

The frame 2 may be any suitable structure adapted to support the bed plate 3, the shearing member 4, the guide members 7, and the linkage for moving the shearing member 4. In the illustrated structure, the frame 2 has longitudinally spaced end walls 21 and 22 adjacent the ends 6 and 8 respectively of the frame 2. The space between the end walls 21 and 22 defines a workpiece receiving compartment, as later described. The frame 2 includes lower front and rear walls 23 and 24 respectively extending longitudinally between the end walls 21 and 22.

The lower front and rear walls 23 and 24 have aligned upper edges adapted to support the bed plate 3 thereon and in a position such that the bed plate 3 has a substantially horizontal upper surface. The bed plate 3 extends between the end walls 21 and 22. It may be desirable to provide additional support for the bed plate 3, therefore, the bed plate 3 is supported on a plurality of transverse support members 25 extending between and connected to the lower front and rear walls 23 and 24, as by welding.

The lower rear wall 24 has an extension 26 extending beyond the end wall 21 at the one end 6 of the frame 2. A bracket 27 is mounted on the end wall 21 in laterally spaced relation with the extension 26 of the lower rear wall 24. The extension 26 and the bracket 27 have aligned apertures therein with suitable bearings therein adapted to receive a pin 28 for pivotally mounting the one end 5 of the shearing member 4.

The lower rear wall 24 also has an extension 29 extending from the end wall 22 at the other end 8 of the frame 2. The extension 29 has a suitable bearing mounted therein and adapted to receive a pin 30 pivotally mounting the other end 20 of the connecting link 19, as later described.

The guide members 7 are mounted on the end wall 22 at the other end of the frame 2. The illustrated guide members comprise a pair of spaced ribs or flanges extending from the end wall 22. The space between the ribs or flanges defines the desired path for movement of the shearing member 4.

In metal working apparatus, it is desirable to hold a workpiece in a fixed position while moving a metal engaging member into engagement therewith. In the illustrated structure, the frame 2 includes an upper front wall 31 extending between the end walls 21 and 22. The upper front wall 31 is spaced above the bed plate 3 and has a bottom flange 32 positioned above and substantially parallel with the bed plate 3. The bottom flange 32 has a plurality of longitudinally spaced workpiece engaging members 33 depending therefrom. The workpiece engaging members 33 have suitable extensible portions 34 positioned above the bed plate 3 and adapted to engage a workpiece and hold same in clamped engagement with the bed plate 3.

The shearing member 4 is positioned adjacent the lower rear wall 24 and is movable by and cooperates with a shearing edge 35 of the bed plate member 3 to cut a workpiece held in position on the bed plate 3. The illustrated shearing member 4 is a substantially rigid structural member in the form of a plate or box beam having an upper surface or edge 36 and a lower surface or edge 37 which has a suitable metal cutting blade 38 mounted thereon and adapted to cooperate with the shearing edge 35 of the bed plate 3 to cut a metal workpiece held on the bed plate 3.

The illustrated shearing member 4 has suitable wear plates 39 and 40 mounted thereon and positioned intermediate the ends thereof. The wear plates 39 and 40 are positioned to be in sliding engagement with the guide members 7 whereby the shearing member 4 is retained in a selected path during raising and lowering thereof.

The power means may be carried by the frame 2 on the shearing member 4 and in the illustrated structure, the shearing member 4 has a pair of laterally spaced ears 41 and 42 extending upwardly from the upper surface or edge 36 thereof and the ears 41 and 42 are positioned adjacent the one end 5 of the shearing member 4. The ears 41 and 42 have aligned apertures with suitable bearings therein which are adapted to receive a pin 43 extending between the ears 41 and 42. The pin 43 is adapted to pivotally mount the one end 10 of the extensible member 9 on the one end 5 of the shearing member 4.

A pair of laterally spaced ears 44 and 45 extend upwardly from the upper surface or edge 36 of the shearing member 4 and the ears 44 and 45 are positioned adjacent the other end 16 of the shearing member 4. The ears 44 and 45 also have aligned apertures with suitable bearings therein which are adapted to receive a pin 46 defining the second pivot point 15 of the crank arm 14.

The extensible member 9 may be any suitable heavy duty hydraulic or pneumatic member adapted to exert sufficient force on a linkage for moving the shearing member 4. The illustrated extensible member 9 has the one end portion 10 thereof formed with a suitable aperture having a bearing therein which is adapted to receive therein the pin 43 mounted above the one end 5 of the shearing member 4. The extensible member 9 has a yoke portion at the other end 11 thereof with suitable aligned apertures each having bearings therein adapted to receive a pin 47 defining the first pivot point 12 of the crank arm 14.

The crank arm is a form of bell crank with the spacing between pivot points providing long and short lever arms with the long lever arm being connected to the power means. As illustrated, the crank arm is a planar member generally triangular in shape and having the pivot points 12, 15, and 17 in respective corners thereof. The crank arm 14 is positioned above the shearing member 4 and is substantially coplanar with the shearing member 4 and the extensible member 9. The crank arm 14 has a suitable bearing mounted in one corner thereof and adapted to receive the pin 47 mounted in the other end 11 of the extensible member 9. The crank arm 14 also has a suitable bearing mounted in a second corner thereof and adapted to receive the pin 46 extending between the ears 44 and 45 at the other end 16 of the shearing member 4. The third corner of the crank arm 14 has a bearing therein adpated to receive a pin 48 defining the third pivot point 17 or fulcrum and having the one end 18 of the connecting link 19 pivotally connected thereto. The pin 48 defines a fulcrum for movement of the first and second pivot points 12 and 15 respectively about the third pivot point 17 while the third pivot point 17 or fulcrum is moving about the other end 20 of the connecting link 19.

The connecting link 19 is illustrated as a pair of spaced elongated generally planar members each pivotally mounted on and extending between the pin 48 at the one end 18 therof and the pin 30 at the other end 20 thereof. The connecting link 19 has a longitudinal axis extending between the pins 48 and 30. The members defining the connecting link 19 are positioned on opposite sides of the shearing member 4 and the ends 18 and 20 of the connecting link 19 have suitable bearings therein to receive the pins 48 and 30 respectively. The connecting link 19 is positioned between the pin 46 at the other end 16 of the shearing member 4 and the other end 8 of the frame 2.

The position and orientation of the components of the linkage for moving the shearing member 4 is a feature of the invention and the relationship between the pivot points of the crank arm 14, the other end 16 of the shearing member 4, and the connecting link 19 cooperate to increase shearing force as the other end 16 of the shearing member 4 is moved toward the one edge 35 of the bed plate 3. The first pivot point 12 is spaced a greater distance from the third pivot point 17 or fulcrum than the spacing between the second pivot point 15 and the third pivot point 17 or fulcrum. When the other end 16 of the shearing member 4 is in a raised position with the extensible member 9 in a fully retracted position, the first pivot point 12 is positioned on one side of the longitudinal axis of the connecting link 19 and the second pivot point 15 is positioned on the other side of the longitudinal axis of the connecting link 19. During extension of the extensible member 9, the first pivot point 12 is moved to and beyond a position in alignment with the longitudinal axis of the connecting link 19 whereby the first pivot point 12 and the second pivot point 15 are then on the same side of the longitudinal axis of the connecting link 19.

The second pivot point 15 of the crank arm 14 is laterally spaced from the longitudinal axis of the connecting link 19 when the other end 16 of the shearing member 4 is in a raised position and the extensible member 9 is in fully retracted position. The second pivot point 15 of the crank arm 14 is positioned to be moved in an arc about the third pivot point 17 or fulcrum of the crank arm 14 and toward the longitudinal axis of the connecting link 19 when the other end 16 of the shearing member 4 is being moved toward the shearing edge 35 of the bed plate 3 thereby increasing the force applied to the pin 46 as the third pivot point 17 or fulcrum is moved in an arc about the other end 20 of the connecting link 19 and away from the one end 8 of the frame 2, whereby the third pivot point 17 provides a movable fulcrum for the crank arm 14.

The pin 28 having the one end 5 of the shearing member 4 mounted thereon has a longitudinal axis positioned below an upper surface of the bed plate 3 and the longitudinal axis of the pin 28 is substantially coplanar with the lower or cutting edge of the blade 38 mounted on the lower surface or edge 37 of the shearing member 4.

The illustrated and described arrangement of the components of the linkage for moving the shearing member 4 is such that the third pivot point 17 or fulcrum of the crank arm moves in an arc about the toher end 20 of the connecting link 19 while the other end 16 of the shearing member 4 moves in an arc about the one end 5 thereof. The first pivot point 12 and the second pivot point 14 each are moved in a arespective arc about the third pivot point 17 or fulcrum of the crank arm 14 during movement of the first pivot point 12 and the third pivot point 17 in respective arcs about the second pivot point 15.

It is to be understood that while I have illustrated and described one form of my invention, it is not to be limited to the specific form or arrangement of parts herein described and shown.

What I claim and desire to secure by letters patent is:

1. A shearing apparatus comprising:
   a. an elongated frame having opposite ends and a bed plate having a shear edge extending along a major portion of the distance between the opposite ends of said frame;
   b. said bed plate of said frame has a substantially horizontal upper surface;
   c. an elongated shearing member having opposite ends, one end of said shearing member being pivotally mounted on said frame adjacent one end of said frame;
   d. said shearing member has an upper edge and a lower edge;
   e. the pivotal mounting of the one end of said shearing member on said frame comprises a pin having a longitudinal axis positioned below the upper surface of said bed plate;
   f. an extensible member having one end thereof pivotally supported adjacent said one end of said frame;
   g. a crank arm having a fulcrum pivot and a long arm and a short arm, the other end of said extensible member being pivotally connected to said long crank arm, said short crank arm being pivotally connected to said shearing member adjacent the other end thereof;
   h. the other end of said extensible member is pivotally connected to a first pivot point of said crank arm;
   i. the other end of said shearing member is pivotally connected to a second pivot point of said crank arm;
   j. the long arm of said crank arm is defined by the portion of the crank arm between said fulcrum pivot and said first pivot point;
   k. the short arm of said crank arm is defined by the portion of the crank arm between said fulcrum pivot and said second pivot point;
   l. said crank arm and said second pivot point thereof being positioned above the upper edge of said shearing member;
   m. means on said frame movably supporting said crank fulcrum pivot to accommodate the arcs of the short lever arm and shearing member as the crank arm is actuated by the extensible member;
   n. said means movably supporting said crank fulcrum pivot comprises an elongated connecting link having one end thereof pivotally connected to said fulcrum pivot of said crank arm and the other end thereof pivotally connected to the other end of said frame; and
   o. guide means mounted on said frame adjacent the other end thereof to guide said shearing member during movement thereof in shearing cooperation with the bed plate shear edge of said frame in response to operation of said extensible member.

2. A shearing apparatus as set forth in claim 1 wherein:
   a. said extensible member is positioned above said shearing member;
   b. said crank arm is positioned above said shearing member; and
   c. said connecting link is positioned between said guide means and said other end of said shearing member whereby operation of said extensible member;
      1. moves the other end of said shearing member in an arc about the one end thereof;
      2. moves said fulcrum pivot of said crank arm in an arc about the other end of said connecting link; and
      3. moves each of said first pivot point and said second pivot point in a respective arc about said fulcrum pivot point of said crank arm during movement of each of said first pivot point and said fulcrum pivot in a respective arc about second pivot point.

3. A shearing apparatus as set forth in claim 1 wherein:
   a. said fulcrum pivot of said crank arm is positioned to be moved in an arc about the other end of said connecting link in response to operation of said extensible member; and
   b. said second pivot point of said crank arm is positioned to be moved in an arc about said fulcrum pivot during movement of said fulcrum pivot of said crank arm to thereby move the other end of said shearing member in an arc about the longitudinal axis of said pin.

4. A shearing apparatus as set forth in claim 3 wherein said first pivot point of said crank arm is positioned to be moved in an arc about said second pivot point in response to operation of said extensible member and during movement of said second pivot point in an arc about said fulcrum pivot.

5. A shearing apparatus as set forth in claim 4 wherein:
   a. said first pivot point is spaced a greater distance from said fulcrum pivot than the spacing between said second pivot point and said fulcrum pivot;
   b. said connecting link has a longitudinal axis;
   c. said first pivot point is positioned to be on one side of the longitudinal axis of said connecting link and said second pivot point is positioned to be on the other side of the longitudinal axis of said connecting link when said extensible member is fully retracted and said shearing member is in a raised position; and
   d. said first pivot point is positioned to be moved to and beyond a position in alignment with the longitudinal axis of said connecting link during extension of said extensible member whereby said first pivot point and said second pivot point are on the same side of the longitudinal axis of said connecting link.

6. A shearing apparatus comprising:
   a. an elongated frame having opposite ends and a bed plate having a shear edge extending along a major portion of the distance between the opposite ends of said frame;
   b. an elongated shearing member having opposite ends, one end of said shearing member being pivotally mounted on said frame adjacent one end of said frame for swinging movement toward and away from said shear edge of the bed plate;
   c. an extensible member having one end thereof pivotally supported adjacent said one end of said frame;
   d. a crank arm above and adjacent the other end of the shearing member and having a fulcrum pivot and a long arm and a short arm;
   e. means pivotally connecting the other end of the extensible member to a first pivot point of said crank arm, said long arm of said crank arm being defined by the portion of the crank arm between said fulcrum pivot and said first pivot point;
   f. means pivotally connecting the other end of said shearing member to a second pivot point of said crank arm, the short arm of said crank arm being defined by the portion of the crank arm between said fulcrum pivot and said second pivot point;
   g. a generally upright elongate link having a lower end pivotally mounted on the frame adjacent the other end thereof below said other end of the shearing member;
   h. means pivotally connecting the upper end of said link to said crank arm at the fulcrum pivot thereof for swinging movement of said link to accommodate the arcs of the short lever arm and the shearing member as the crank arm is actuated by the extensible member; and
   i. guide means mounted on said frame adjacent the other end thereof to guide said shearing member during movement thereof in shearing cooperation with the bed plate shear edge of said frame in response to operation of said extensible member.

* * * * *